(12) United States Patent
Kishi et al.

(10) Patent No.: US 10,207,477 B2
(45) Date of Patent: Feb. 19, 2019

(54) STAINLESS STEEL CLAD STEEL PLATE INCLUDING CLADDING MATERIAL FOR STAINLESS STEEL CLAD STEEL PLATE AND METHOD OF MANUFACTURING THE SAME

(71) Applicant: JFE Steel Corporation, Tokyo (JP)

(72) Inventors: Keiichiro Kishi, Fukuyama (JP);
Yoshihiro Yazawa, Chiba (JP);
Shunichi Tachibana, Fukuyama (JP);
Yota Kuronuma, Fukuyama (JP);
Toshiyuki Hoshino, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 1035 days.

(21) Appl. No.: 14/396,256

(22) PCT Filed: Apr. 19, 2013

(86) PCT No.: PCT/JP2013/002658
§ 371 (c)(1),
(2) Date: Oct. 22, 2014

(87) PCT Pub. No.: WO2013/161238
PCT Pub. Date: Oct. 31, 2013

(65) Prior Publication Data
US 2015/0104667 A1    Apr. 16, 2015

(30) Foreign Application Priority Data

Apr. 25, 2012 (JP) .................................. 2012-099681
Mar. 29, 2013 (JP) .................................. 2013-071281

(51) Int. Cl.
| | | |
|---|---|---|
| *B32B 15/01* | (2006.01) | |
| *C22C 38/54* | (2006.01) | |
| *C22C 38/44* | (2006.01) | |
| *C22C 38/02* | (2006.01) | |

(Continued)

(52) U.S. Cl.
CPC .......... *B32B 15/011* (2013.01); *B23K 9/0026* (2013.01); *B23K 9/02* (2013.01); *B23K 9/16* (2013.01); *B23K 9/23* (2013.01); *B23K 20/04* (2013.01); *B23K 20/16* (2013.01); *B23K 20/227* (2013.01); *B23K 35/3086* (2013.01); *B32B 15/04* (2013.01); *B32B 15/043* (2013.01); *C21D 6/004* (2013.01); *C21D 8/0263* (2013.01); *C22C 30/00* (2013.01); *C22C 38/00* (2013.01); *C22C 38/001* (2013.01); *C22C 38/002* (2013.01); *C22C 38/004* (2013.01); *C22C 38/02* (2013.01); *C22C 38/04* (2013.01); *C22C 38/44* (2013.01); *C22C 38/54* (2013.01); *B23K 2101/185* (2018.08); *B23K 2101/34* (2018.08); *B23K 2103/04* (2018.08); *B23K 2103/05* (2018.08); *B23K 2103/18* (2018.08); *B32B 2250/02* (2013.01); *C21D 8/0226* (2013.01); *C21D 2251/02* (2013.01); *Y10T 428/12438* (2015.01); *Y10T 428/12958* (2015.01); *Y10T 428/12965* (2015.01); *Y10T 428/12972* (2015.01);

(Continued)

(58) Field of Classification Search
CPC ..... B32B 15/043; B32B 15/04; B32B 15/011; B32B 2250/02; C21D 6/004; C21D 8/0226; C21D 2251/02; C21D 8/0263; B23K 2203/05; B23K 8/0263; B23K 2203/04; B23K 35/3086; B23K 20/04; B23K 9/0026; B23K 9/02; B23K 9/23; B23K 2201/185; B23K 2201/34; B23K 2203/18; B23K 20/16; B23K 20/227; B23K 9/16; B23K 2101/185; B23K 2101/34; B23K 2103/04; B23K 2103/05; B23K 2103/18; Y10T 428/12438; Y10T 428/12958; Y10T 428/12965; Y10T 428/12972; Y10T 428/12979; Y10T 428/24967; Y10T 428/26; C22C 38/001; C22C 38/002; C22C 38/04; C22C 38/44; C22C 38/54; C22C 38/00; C22C 38/004; C22C 30/00; C22C 38/02; C22C 38/08; C22C 38/12; C22C 38/18; C22C 38/22; C22C 38/32; C22C 38/38; C22C 38/40; C22C 38/58

See application file for complete search history.

(56) References Cited

U.S. PATENT DOCUMENTS 4,742,324 A * 5/1988 Shida ...................... C22C 38/44
                                                        148/327

FOREIGN PATENT DOCUMENTS

| JP | 61-144283 | 7/1986 |
|---|---|---|
| JP | 61-223126 | 10/1986 |

(Continued)

OTHER PUBLICATIONS

Machine Translation, Minoru et al., JP 2005-133125, May 2005.*

(Continued)

*Primary Examiner* — Michael E. La Villa
(74) *Attorney, Agent, or Firm* — RatnerPrestia

(57) ABSTRACT

A cladding material for stainless steel clad steel plate, includes, by mass %, 0.03% or less carbon, 1.5% or less silicon, 2.0% or less manganese, 0.04% or less phosphorus, 0.03% or less sulfur, 22.0% to 25.0% nickel, 21.0% to 25.0% chromium, 2.0% to 5.0% molybdenum, 0.15% to 0.25% nitrogen, and the balance being iron and incidental impurities, wherein critical pitting temperature (CPT) after normalization as determined in accordance with ASTM G48-03 Method E is 45° C. or higher, and corrosion loss at a welded zone as determined by a corrosion test in accordance with NORSOK Standard M-601 is 1.0 g/m² or less.

5 Claims, No Drawings

(51) Int. Cl.
| | |
|---|---|
| *C22C 38/00* | (2006.01) |
| *C22C 30/00* | (2006.01) |
| *C22C 38/04* | (2006.01) |
| *C21D 9/46* | (2006.01) |
| *C21D 1/00* | (2006.01) |
| *C21D 8/02* | (2006.01) |
| *B32B 15/04* | (2006.01) |
| *B23K 20/04* | (2006.01) |
| *B23K 35/30* | (2006.01) |
| *B23K 9/00* | (2006.01) |
| *B23K 9/02* | (2006.01) |
| *B23K 9/16* | (2006.01) |
| *B23K 9/23* | (2006.01) |
| *B23K 20/16* | (2006.01) |
| *B23K 20/227* | (2006.01) |
| *C21D 6/00* | (2006.01) |
| *B23K 101/18* | (2006.01) |
| *B23K 101/34* | (2006.01) |
| *B23K 103/04* | (2006.01) |
| *B23K 103/18* | (2006.01) |

(52) U.S. Cl.
CPC .................. *Y10T 428/12979* (2015.01); *Y10T 428/24967* (2015.01); *Y10T 428/26* (2015.01)

(56) References Cited

FOREIGN PATENT DOCUMENTS

| | | |
|---|---|---|
| JP | 63-125615 | 5/1988 |
| JP | 64-031577 | 2/1989 |
| JP | 2-254121 | 10/1990 |
| JP | 2000-290754 | 10/2000 |
| JP | 2001-262284 | 9/2001 |
| JP | 2005-133125 | 5/2005 |
| JP | 4179133 | 5/2005 |
| RU | 2 201 469 | 3/2003 |
| RU | 2 225 793 | 3/2004 |
| RU | 2 255 848 | 7/2005 |

OTHER PUBLICATIONS

Machine Translation, Nippon Kokan KK, JP 2000-290754, Oct. 2000.*
European Communication dated Sep. 12, 2017, of corresponding European Application No. 13782090.8.
Chinese Office Action dated Nov. 21, 2016, of corresponding Chinese Application No. 201380021830.6, along with a Concise Statement of Relevance of Office Action.
Russian Office Action dated Dec. 30, 2015 of corresponding Russian Application No. 2014147317 along with an English translation.
Corresponding Supplementary European Search Report dated Jan. 22, 2015 of European Application No. 13782090.8.
Japanese Notice of Allowance dated Dec. 10, 2013, of corresponding Japanese Application No. 2013-071281, along with a Concise Statement of Relevance of Office Action in English.
Chinese Office Action dated May 13, 2016, of corresponding Chinese Application No. 201380021830.6, along with a Search Report in English.
Mao, P., "Material Forming Technology," Jul. 1, 2007, pp. 388-390, along with an English translation of the relevant portion.

* cited by examiner

STAINLESS STEEL CLAD STEEL PLATE INCLUDING CLADDING MATERIAL FOR STAINLESS STEEL CLAD STEEL PLATE AND METHOD OF MANUFACTURING THE SAME

TECHNICAL FIELD

This disclosure relates to a cladding material for austenite stainless steel clad steel plate used for various applications such as marine structures, vessels, and sea water desalination equipment, and also relates to a stainless steel clad steel plate including such a cladding material and a method for manufacturing such a stainless steel clad steel plate.

BACKGROUND ART

Recently, there has been a growing need for durable, long-lived, maintenance-free industrial equipmentand structures. As a material that meets this need, attention has been given to stainless steels. However, the prices of alloying elements such as nickel, molybdenum, and chromium, which are main raw materials for stainless steels, tend to rise and fluctuate. Accordingly, particular attention has been given to stainless steel clad steels as an alternative to solid stainless steels. Stainless steel clad steels provide for good corrosion resistance of solid stainless steels to be more economically utilized and are available at low and stable prices. A stainless steel clad steel is manufactured by bonding together two types of steels with different properties, i.e., a stainless steel as a cladding material and an ordinary steel as a base material. The clad steel, which has a metallurgical bond between different types of steels, provides novel properties that cannot be achieved by a single metal or alloy and, unlike a plated steel, does not have the risk of peeling of the plated layer. A stainless steel clad steel uses a smaller amount of stainless steel but provides a comparable corrosion resistance to a solid material (which refers to a material made of a stainless steel used as a cladding material throughout the thickness thereof). This is advantageous both economically and functionally.

As discussed above, stainless steel clad steels are considered significantly useful functional steels and, recently, there has been a growing need for stainless steel clad steels in various industrial fields. In particular, there is a need for stainless steel clad steels with high sea water corrosion resistance in applications where they are used in highly corrosive sea water environments, including marine structures, sea water desalination equipment, and vessels such as floating production, storage, and offloading systems (hereinafter referred to as "FPSO").

A passivation film on a stainless steel fails more easily in the presence of chloride ions. The mode of corrosion of the passivation film is pitting corrosion or crevice corrosion. Whereas the mode of corrosion in acids such as sulfuric acid and hydrofluoric acid is general corrosion, the mode of corrosion in sea water is local corrosion. To eliminate origins of local corrosion, it is very important to consider pitting corrosion resistance.

The pitting corrosion resistance of a stainless steel is typically expressed as the pitting index: Cr (% by mass)+3.3Mo (% by mass)+16N (% by mass). A stainless steel having a higher pitting index has an excellent pitting corrosion resistance. This parameter, however, is applicable only to a solid stainless steel subjected to heat treatment to dissolve precipitates and so on, and is not directly applicable to the pitting corrosion resistance of a cladding material of a stainless steel clad steel, which is a composite material of a stainless steel and a carbon steel.

A stainless steel clad steel is generally normalized by heating to the temperature range of 850° C. to 950° C. and then air cooling to provide good mechanical properties such as high base material strength and toughness before use. A stainless steel may exhibit significantly low corrosion resistance after improper heat treatment or thermal history in a heat-affected zone during welding. One cause of the low corrosion resistance is that carbides and intermetallic compounds such as σ phase precipitate after improper heat treatment or thermal history in a heat-affected zone during welding. The thermal history of a clad steel varies with the thickness thereof. In particular, carbides and intermetallic compounds such as a phase precipitate more readily in a clad steel having a thickness of 30 mm or more because of its low cooling rate.

To prevent a decrease in the corrosion resistance of a clad steel after normalization, which is performed to provide good mechanical properties of the base material, Japanese Unexamined Patent Application Publication No. 63-125615 discloses a method that specifies the composition of the cladding material to maintain high corrosion resistance of the austenite stainless steel used as the cladding material after normalization at 850° C. to 950° C. The stainless steel clad steel provided by that method, however, has insufficient sea water corrosion resistance, i.e., a corrosion rate of about 2 g/m$^2$·h as measured by a ferric chloride corrosion test.

Japanese Patent No. 4179133 discloses a method that specifies the conditions of solid solution heat treatment and the composition of a base carbon steel to manufacture a stainless steel clad steel pipe using a stainless steel with good sea water resistance as a cladding material and a carbon steel as a base material. Japanese Patent No. 4179133, however, requires the stainless steel used as the cladding material to be selected depending on the application of stainless steel clad steel pipes (such as marine structures) to provide the corrosion resistance, including sea water corrosion resistance, required for that application. That is, the method of adjustment disclosed in Japanese Patent No. 4179133 depends only on the composition of the stainless steel. Thus, if that method is applied to a stainless steel clad steel, it is difficult to ensure bonding interface integrity (adhesion) with improved reliability while simultaneously maintaining good properties (corrosion resistance and mechanical properties) of the base material and the cladding material. In addition, it is further difficult to apply this method to all of high-grade steels and various other steels.

It could therefore be helpful to provide a cladding material for stainless steel clad steel plates, with good sea water corrosion resistance that offers bonding interface integrity with improved reliability while simultaneously maintaining good properties (corrosion resistance and mechanical properties) of the base material and the cladding material, and also to provide a stainless steel clad steel plate including such a cladding material and a method of manufacturing such a stainless steel clad steel plate.

SUMMARY

We thus provide:

[1] A cladding material for stainless steel clad steel plate comprising, by mass %, 0.03% or less carbon, 1.5% or less silicon, 2.0% or less manganese, 0.04% or less phosphorus, 0.03% or less sulfur, 22.0% to 25.0% nickel, 21.0% to 25.0% chromium, 2.0% to 5.0% molybdenum, 0.15% to 0.25% nitrogen, and the balance being iron and incidental impurities, wherein the critical pitting temperature (CPT) after normalization as determined in accordance with ASTM G48-03 Method E is 45° C. or higher, and the corrosion loss at a welded zone as determined by a corrosion test in accordance with NORSOK Standard M-601 is 1.0 g/m$^2$ or less.

[2] The cladding material for stainless steel clad steel plate according to [1], wherein the cladding material further comprises, by mass %, 0.0010% to 0.0055% boron.

[3] The cladding material for stainless steel clad steel plate according to [1] or [2], wherein precipitates extracted from the cladding material by constant-current electrolysis with 10% by volume acetylacetone-1% by mass tetramethylammonium chloride-methanol contain a chromium content of 0.5% by mass or less and a molybdenum content of 0.3% by mass or less.

[4] The cladding material for stainless steel clad steel plate according to any one of [1] to [3], wherein the area percentage of a phase precipitated in a surface of the cladding material is 2.0% or less.

[5] A stainless steel clad steel plate including the cladding material according to any one of [1] to [4] and a carbon steel or a low-alloy steel as a base material and having a total thickness of 30 to 100 mm.

[6] A method of manufacturing the stainless steel clad steel plate according to [5] including hot rolling using a sacrificial material at a reduction ratio of 5 or more and then normalizing by heating to 850° C. to 950° C. and air cooling.

We provide a stainless steel clad steel plate with good sea water corrosion resistance that has a total thickness of 30 to 100 mm.

This stainless steel clad steel plate is suitable for applications requiring sea water corrosion resistance, including marine structures, vessels such as FPSO, and sea water desalination equipments.

DETAILED DESCRIPTION

To provide good sea water corrosion resistance, the composition, manufacturing conditions, and other properties of the stainless steel clad steel plate need to be specified.

1. The grounds for the limitations on the composition of the stainless steel used as the cladding material will be described first. In the following description, percentage % denotes by mass % unless otherwise stated.

Carbon: 0.03% or Less

A lower carbon content is preferred in terms of corrosion resistance, particularly in a weld heat-affected zone. The carbon content therefore needs to be limited to 0.03% or less. Preferably, the carbon content is 0.020% or less.

Silicon: 1.5% or Less

Although a silicon content of 0.02% or more is necessary for deoxidization, a silicon content of more than 1.5% would significantly decrease the hot workability. Thus, the silicon content should be 1.5% or less. Preferably, the silicon content is 0.60% or less.

Manganese: 2.0% or Less

Although a manganese content of 0.02% or more is necessary for deoxidization, a manganese content of more than 2.0% would decrease the corrosion resistance. Thus, the manganese content should be 2.0% or less. Preferably, the manganese content is 0.60% or less.

Phosphorus: 0.04% or Less, Sulfur: 0.03% or Less

Although a lower phosphorus content and a lower sulfur content are preferred in terms of hot workability, a phosphorus content of more than 0.04% and a sulfur content of more than 0.03% would decrease the hot workability. Thus, the phosphorus content should be 0.04% or less, and the sulfur content should be 0.03% or less. Preferably, the phosphorus content is 0.03% or less, and the sulfur content is 0.01% or less.

Nickel: 22.0% to 25.0%

A nickel content of 22.0% or more is necessary in terms of austenite phase stability, mainly depending on the balance with the chromium and molybdenum contents. The nickel content, however, should be 25.0% or less, taking into account economy and the increase in hot deformation resistance due to increased nickel content. To achieve a balance of austenite phase stability and economy, a nickel content of 22.0% to 24.5% is preferred. More preferably, the nickel content is 22.5% to 24.0%.

Chromium: 21.0% to 25.0%

A chromium content of 21.0% or more is necessary because chromium is effective in improving pitting corrosion resistance and crevice corrosion resistance. A chromium content of more than 25.0%, however, significantly promotes precipitation of a phase during the manufacture of the cladding material, and at clad rolling and cooling, therefore decreasing the corrosion resistance and the hot workability. Thus, the chromium content should be 21.0% to 25.0%. To improve the pitting corrosion resistance and the crevice corrosion resistance while inhibiting precipitation of a phase, a chromium content of 21.0% to 24.0% is preferred. More preferably, the chromium content is 22.0% to 23.5%.

Molybdenum: 2.0% to 5.0%

A molybdenum content of 2.0% or more is necessary because molybdenum is effective in improving the pitting corrosion resistance and the crevice corrosion resistance. A molybdenum content of more than 5.0%, however, would significantly promote precipitation of a phase during the manufacture of the cladding material, and at clad rolling and cooling, therefore decreasing the corrosion resistance and the hot workability. Thus, the molybdenum content should be 2.0% to 5.0%. To improve the pitting corrosion resistance and the crevice corrosion resistance while inhibiting precipitation of a phase, a molybdenum content of 2.0% to 4.5% is preferred. More preferably, the molybdenum content is 2.5% to 3.5%.

Nitrogen: 0.15% to 0.25%

Nitrogen is effective in improving the corrosion resistance. To achieve this effect, the nitrogen content should be 0.15% or more. A nitrogen content of more than 0.25%, however, is not practical because of its relationship with the contents of other elements. Thus, the nitrogen content should be 0.15% to 0.25%. Preferably, the nitrogen content is 0.18% to 0.22%.

Whereas the cladding material for stainless steel clad steel plate has the foregoing basic composition, the balance being iron and incidental impurities, it may further contain boron within the following range.

Boron: 0.0010% to 0.0055%

Boron is effective in improving corrosion resistance and hot workability. To achieve this effect, the boron content should be 0.0010% or more. A boron content of more than 0.0055%, however, would decrease the corrosion resistance and the hot workability. Thus, if boron is present, the boron content is preferably 0.0010% to 0.0055%. More preferably, the boron content is 0.0015% to 0.0035%.

The balance is iron and incidental impurities. The cladding material may contain trace amounts of other elements that do not interfere with the advantageous effects described above.

The base material for stainless steel clad steel plate may be a carbon steel or a low-alloy steel.

The stainless steel clad steel plate has a thickness (total thickness) of 30 to 100 mm. In particular, a stainless steel clad steel plate having such a thickness is required in marine structures, vessels such as FPSO, and sea water desalination equipments.

The stainless steel clad steel plate is manufactured by cladding one or both surfaces of the base material with the stainless steel having the composition described above as the cladding material.

2. The sea water corrosion resistance of the stainless steel used as the cladding material will then be described.

(a) The critical pitting temperature (CPT) after normalization as determined in accordance with ASTM G48-03 Method E is 45° C. or higher.

The base material for stainless steel clad steel plate requires properties suitable for use as a structural material in marine structures, vessels such as FPSO, and sea water desalination equipments. Accordingly, hot rolling is often followed by normalization involving heating to 850° C. to 950° C. and air cooling. This treatment applies the same thermal history to the stainless steel used as the cladding material. To provide sufficient sea water corrosion resistance after such a thermal history, the critical pitting temperature (CPT) should be 45° C. or higher. Thus, the critical pitting temperature (CPT) as determined in accordance with ASTM G48-03 Method E should be 45° C. or higher. The test method will be described in the Examples section.

(b) The corrosion loss at a welded zone as determined by a corrosion test in accordance with NORSOK Standard M-601 is 1.0 g/m$^2$ or less.

A clad steel plate is often used as a welded structural member, rather than used alone. Accordingly, the stainless steel used as the cladding material is also welded. To provide sufficient sea water corrosion resistance, the corrosion loss at a welded zone as determined by a corrosion test in accordance with NORSOK Standard M-601 needs to be 1.0 g/m$^2$ or less. Examples of welding method include submerged arc welding, MIG welding, and MAG welding. The heat input at welding is preferably 50 kJ/cm or less.

A CPT of 45° C. or higher and a corrosion loss of 1.0 g/m$^2$ or less are achieved by controlling the composition of the stainless steel used as the cladding material and employing the manufacturing method described later. The test method will be described in the Examples section.

The corrosion resistance of the stainless steel used as the cladding material is further specified by the following properties.

(c) Precipitates extracted by constant-current electrolysis with 10% by volume acetylacetone-1% by mass tetramethylammonium chloride-methanol preferably contain a chromium content of 0.5% by mass or less and a molybdenum content of 0.3% by mass or less.

The use of constant-current electrolysis allows the amount of precipitates in steel to be quantitatively evaluated. The extracted precipitates can be analyzed by X-ray diffraction (XRD) to precisely identify the type of precipitates.

The sea water corrosion resistance of the a phase is evaluated from the contents of chromium and molybdenum in the a phase. The chromium content of the precipitates is 0.5% by mass or less because a chromium content of more than 0.5% by mass would degrade the pitting corrosion resistance. A chromium content of 0.3% by mass or less is more preferred in terms of pitting corrosion resistance.

The molybdenum content of the precipitates is 0.3% by mass or less because a molybdenum content of more than 0.3% by mass would degrade the pitting corrosion resistance. A molybdenum content of 0.2% by mass or less is more preferred in terms of pitting corrosion resistance.

(d) The area percentage of the a phase precipitated in the surface of the cladding material is 2.0% or less.

A large amount of a phase precipitated is undesirable because it would decrease the chromium and molybdenum contents of the austenite phase around the a phase and would therefore degrade the pitting corrosion resistance. Specifically, an area percentage of more than 2.0% is undesirable because it would degrade the pitting corrosion resistance. The area percentage is determined by examining the microstructure at about 400× magnification and performing image analysis on the micrograph. The microstructure of the a phase is analyzed in advance by a technique such as energy-dispersive X-ray spectroscopy to determine that the microstructure has high chromium and molybdenum contents.

3. Next, a method of manufacturing a stainless steel clad steel plate is specified.

(a) The stainless steel clad steel plate is manufactured by rolling using a sacrificial material at a reduction ratio of 5 or more.

The sacrificial material is used to prevent warpage after rolling.

If hot rolling is used to manufacture a stainless steel clad steel plate, which is a composite material of an austenite stainless steel (cladding material) and a carbon steel (base material), the warpage generates during the hot rolling or cooling because the two types of steels have different deformation resistances and thermal expansion coefficients. To prevent such a warpage, a method using a sacrificial material is employed, in which a carbon steel plate is welded to a surface of the austenite stainless steel along the periphery thereof before hot rolling.

The hot rolling is performed at a reduction ratio of 5 or more because high-temperature rolling at a reduction ratio of 5 or more produces a coupling force between the steels and thus provides good adhesion.

(b) The hot rolling is followed by normalization involving heating to 850° C. to 950° C. and air cooling.

As described above, because the base material for stainless steel clad steel plate requires the properties suitable for use as a structural material in marine structures, vessels such as FPSOs, and sea water desalination equipments, hot rolling is often followed by normalization involving heating to 850° C. to 950° C. and air cooling. The heating is performed to 850° C. to 950° C. because heating to 850° C. or higher is effective in improving the microstructure. Heating above 950° C. would not be effective in improving the microstructure because it would coarsen crystal grains. The cooling is performed by air cooling because rapid cooling would cause strain due to the difference in thermal expansion coefficient between the cladding material and the base material. Specifically, the cooling rate is 0.8° C./s or less.

EXAMPLES

Examples will now be described.

Austenite stainless steels having the compositions shown in Table 1 and SS400 steels (hereinafter abbreviated as "ordinary steel") were used. SS400 steels having a thickness of 150 mm, serving as base materials, austenite stainless steels having a thickness of 13 mm, serving as cladding materials, and ordinary steels having a thickness of 26 mm, serving as sacrificial materials on the surface of the cladding materials, were combined to slabs having a thickness of (150+13+26) mm.

These slabs were heated to 1,230° C., hot finish-rolled at 970° C., retained at 910° C. for 10 minutes, and cooled in air to manufacture stainless steel clad steel plates having a thickness of (29.5+2.5) mm.

The pitting corrosion resistance of the cladding material of the thus-manufactured stainless steel clad steel plates was evaluated in accordance with ASTM G48-03 Method E, described later. The pitting corrosion resistance at a welded zone was then evaluated by a corrosion test using a welding test specimen described below. The welding test specimen was fabricated by forming X-grooves, welding the base material using a low-alloy welding wire, and TIG welding the cladding material in argon gas using a 625 alloy welding material having a diameter of 1.2 mm in accordance with JIS Z3334. The cladding material was TIG welded in four passes at a welding current of 200 A, a welding voltage of 25 V, and a welding speed of 30 cm/min. After excess welded part was removed from the surface layer of the cladding material, a test specimen having a thickness of 2.0 mm, a width of 20 mm, and a length of 50 mm was cut from the stainless steel clad steel plate. The test specimen included the welded zone and the heat-affected zone which were present with a ratio of 1:1. The corrosion loss was determined in accordance with ASTM G48-03 Method A, described later.

To evaluate the amount of σ phase precipitates, the chromium and molybdenum contents of the precipitates extracted by electrolytic extraction were determined. The electrolyte used was 10% by volume acetylacetone-1% by mass tetramethylammonium chloride-methanol. A residue extracted by constant-current electrolysis was filtered off through a 0.2 μm mesh organic filter and was decomposed by heating with a mixed acid (0.8% by mass tartaric acid and 10% by mass sulfuric acid). The chromium and molybdenum contents were determined by ICP emission spectroscopy.

Critical Pitting Temperature (CPT): ASTM G48-03 Method E

A dipping test was performed at various temperatures in increments of 5° C. in a 6% by mass $FeCl_3$ and 1% by mass HCl solution for 24 hours. This dipping test was performed three times. A stainless steel clad steel plate in which a pitting corrosion depth of 0.025 mm or more occurred was evaluated as unacceptable. A stainless steel clad steel plate in which no pitting corrosion occurred was evaluated as acceptable. The maximum temperature reached by a stainless steel clad steel plate evaluated as unacceptable was determined as CPT (° C.). A CPT of 45° C. or higher was evaluated as good. A CPT of 50° C. or higher is more preferred.

Ferric Chloride Test: ASTM G48-03 Method A

A dipping test was performed in a 6% by mass $FeCl_3$ solution at 40° C. for 24 hours. The corrosion loss was determined from the weight loss after the dipping test. The target corrosion loss is 1.0 $g/m^2$ or less, preferably 0.8 $g/m^2$ or less.

TABLE 1 mass %

| No. | C | Si | Mn | P | S | Ni | Cr | Mo | B | N | CPT (° C.) | Corrosion loss at a welded zone ($g/m^2$) | Cr content of precipitates (mass %) | Mo content of precipitates (mass %) | Remarks |
|---|---|---|---|---|---|---|---|---|---|---|---|---|---|---|---|
| 1 | 0.019 | 0.31 | 0.51 | 0.024 | 0.009 | 23.1 | 23.4 | 3.5 | 0.0002 | 0.202 | 45 | 0.69 | 0.10 | 0.07 | Example |
| 2 | 0.018 | 0.29 | 0.58 | 0.028 | 0.006 | 23.4 | 23.4 | 3.4 | 0.0001 | 0.199 | 45 | 0.64 | 0.10 | 0.05 | Example |
| 3 | 0.017 | 0.28 | 0.61 | 0.023 | 0.007 | 22.9 | 23.2 | 3.1 | 0.0003 | 0.210 | 50 | 0.54 | 0.09 | 0.03 | Example |
| 4 | 0.015 | 0.27 | 0.50 | 0.023 | 0.008 | 23.0 | 23.0 | 3.1 | 0.0022 | 0.190 | 50 | 0.51 | 0.08 | 0.03 | Example |
| 5 | 0.020 | 0.35 | 1.30 | 0.030 | 0.005 | 23.1 | 23.1 | 3.5 | 0.0016 | 0.200 | 50 | 0.61 | 0.09 | 0.03 | Example |
| 6 | 0.010 | 0.45 | 1.18 | 0.009 | 0.001 | 23.2 | 23.2 | 4.0 | 0.0030 | 0.190 | 45 | 0.76 | 0.14 | 0.16 | Example |
| 7 | 0.009 | 0.37 | 1.22 | 0.018 | 0.003 | 22.9 | 22.9 | 4.5 | 0.0025 | 0.182 | 45 | 0.79 | 0.15 | 0.15 | Example |
| 8 | 0.017 | 0.23 | 0.77 | 0.012 | 0.010 | 23.1 | 23.1 | 2.7 | 0.0020 | 0.211 | 45 | 0.74 | 0.13 | 0.11 | Example |
| 9 | 0.022 | 0.50 | 0.66 | 0.015 | 0.009 | 23.0 | 23.0 | 2.2 | 0.0021 | 0.195 | 45 | 0.86 | 0.17 | 0.21 | Example |
| 10 | 0.016 | 0.28 | 1.01 | 0.021 | 0.009 | 23.4 | 22.4 | 3.2 | 0.0018 | 0.199 | 50 | 0.73 | 0.09 | 0.04 | Example |
| 11 | 0.021 | 0.31 | 0.78 | 0.031 | 0.011 | 23.4 | 23.8 | 3.0 | 0.0031 | 0.210 | 45 | 0.83 | 0.21 | 0.11 | Example |
| 12 | 0.019 | 0.38 | 0.95 | 0.015 | 0.008 | 23.1 | 24.2 | 3.1 | 0.0045 | 0.194 | 45 | 0.84 | 0.22 | 0.15 | Example |
| 13 | 0.030 | 0.44 | 0.60 | 0.040 | 0.030 | 22.9 | 24.8 | 3.2 | 0.0012 | 0.190 | 45 | 0.81 | 0.21 | 0.13 | Example |
| 14 | 0.014 | 0.30 | 1.12 | 0.031 | 0.009 | 22.8 | 22.1 | 3.0 | 0.0023 | 0.201 | 45 | 0.91 | 0.30 | 0.12 | Example |
| 15 | 0.022 | 0.51 | 1.03 | 0.034 | 0.007 | 23.9 | 23.2 | 3.0 | 0.0041 | 0.187 | 50 | 0.69 | 0.09 | 0.04 | Example |
| 16 | 0.011 | 0.36 | 0.98 | 0.024 | 0.018 | 24.2 | 23.1 | 2.9 | 0.0023 | 0.191 | 50 | 0.71 | 0.10 | 0.05 | Example |
| 17 | 0.019 | 0.33 | 0.78 | 0.022 | 0.017 | 24.5 | 23.5 | 3.1 | 0.0021 | 0.210 | 45 | 0.87 | 0.33 | 0.21 | Example |
| 18 | 0.023 | 0.41 | 0.96 | 0.021 | 0.007 | 22.5 | 23.7 | 3.1 | 0.0019 | 0.194 | 45 | 0.82 | 0.41 | 0.20 | Example |
| 19 | 0.014 | 0.23 | 0.84 | 0.030 | 0.009 | 22.3 | 23.2 | 3.0 | 0.0029 | 0.196 | 45 | 0.81 | 0.43 | 0.22 | Example |
| 20 | 0.016 | 0.46 | 1.14 | 0.024 | 0.005 | 23.0 | 22.9 | <u>5.5</u> | 0.0019 | 0.211 | <u>35</u> | <u>5.12</u> | <u>0.65</u> | <u>0.45</u> | Comparative example |
| 21 | 0.018 | 0.37 | 1.21 | 0.020 | 0.003 | 23.1 | 22.8 | <u>6.2</u> | 0.0022 | 0.194 | <u>30</u> | <u>6.24</u> | <u>0.78</u> | <u>0.51</u> | Comparative example |
| 22 | 0.020 | 0.29 | 0.87 | 0.027 | 0.007 | 23.3 | 23.7 | <u>1.5</u> | 0.0023 | 0.196 | <u>35</u> | <u>5.66</u> | <u>0.71</u> | <u>0.44</u> | Comparative example |
| 23 | 0.023 | 0.35 | 0.57 | 0.031 | 0.009 | 22.8 | 21.0 | 3.1 | 0.0021 | 0.195 | <u>30</u> | <u>6.12</u> | <u>0.88</u> | <u>0.48</u> | Comparative example |
| 24 | 0.019 | 0.37 | 0.67 | 0.028 | 0.010 | 23.1 | 21.5 | 3.2 | 0.0019 | 0.191 | 30 | <u>6.01</u> | <u>0.81</u> | <u>0.51</u> | Comparative example |
| 25 | 0.015 | 0.24 | 0.89 | 0.024 | 0.007 | 23.0 | <u>26.5</u> | 3.0 | 0.0029 | 0.213 | 30 | <u>5.84</u> | <u>0.78</u> | <u>0.44</u> | Comparative example |
| 26 | 0.018 | 0.29 | 1.13 | 0.029 | 0.008 | 22.7 | 23.4 | 2.8 | 0.0019 | 0.204 | 25 | <u>3.12</u> | <u>0.57</u> | <u>0.42</u> | Comparative example |

TABLE 1-continued mass %

| No. | C | Si | Mn | P | S | Ni | Cr | Mo | B | N | CPT (° C.) | Corrosion loss at a welded zone (g/m$^2$) | Cr content of precipitates (mass %) | Mo content of precipitates (mass %) | Remarks |
|---|---|---|---|---|---|---|---|---|---|---|---|---|---|---|---|
| 27 | 0.024 | 0.31 | 1.34 | 0.032 | 0.009 | 23.1 | 23.7 | 2.9 | 0.0022 | 0.193 | 35 | <u>3.30</u> | <u>0.55</u> | <u>0.38</u> | Comparative example |
| 28 | 0.020 | 0.30 | 0.87 | 0.037 | 0.009 | 23.2 | 23.1 | 3.0 | 0.0030 | 0.186 | 35 | <u>3.11</u> | <u>0.56</u> | <u>0.35</u> | Comparative example |

Note:
The underlined values are beyond the scope of the present invention.

As shown in Table 1, our examples have the target properties, i.e., a CPT of 45° C. or higher and a corrosion loss at a welded zone of 1.0 g/m$^2$ or less as determined in accordance with ASTM G48-03 Method A at 40° C. for 24 hours, demonstrating that they have good sea water corrosion resistance.

The invention claimed is:

1. A stainless steel clad steel plate comprising the cladding material for stainless steel clad steel plate, consisting of, by mass %, 0.03% or less carbon, 1.5% or less silicon, 2.0% or less manganese, 0.04% or less phosphorus, 0.03% or less sulfur, 22.0% to 25.0% nickel, 21.0% to 25.0% chromium, 2.0% to 5.0% molybdenum, 0.15% to 0.25% nitrogen, optionally 0.0010% to 0.0055% boron, and the balance being iron and incidental impurities, wherein the critical pitting temperature (CPT) after normalization as determined in accordance with ASTM G48-03 Method E is 45° C. or higher, and the corrosion loss at a welded zone as determined by a corrosion test in accordance with NORSOK Standard M-601 is 1.0 g/m$^2$ or less, and a carbon steel or a low-alloy steel as a base material, and having a total thickness of 30 to 100 mm.

2. The stainless steel clad steel plate according to claim 1, wherein an area percentage of σ (sigma) phase precipitated in a surface of the cladding material is 2.0% or less.

3. The stainless steel clad steel plate according to claim 1, wherein the cladding material precipitates extracted from the cladding material by constant-current electrolysis with 10% by volume acetylacetone-1% by mass tetramethylammonium chloride-methanol contain a chromium content of 0.5% by mass or less and molybdenum content of 0.3% by mass or less.

4. The stainless steel clad steel plate according to claim 3, wherein an area percentage of a phase precipitated in a surface of the cladding material is 2.0% or less.

5. A method of manufacturing the stainless steel clad steel plate according to claim 1, comprising hot rolling with a sacrificial material at a reduction ratio of 5 or more and then normalizing by heating to 850° C. to 950° C. and air cooling.

* * * * *